United States Patent [19]  
Pohl et al.

[11] Patent Number: 4,659,798  
[45] Date of Patent: Apr. 21, 1987

[54] NOVEL ROOM TEMPERATURE VULCANIZABLE POLYDIORGANOSILOXANE COMPOSITIONS

[75] Inventors: Eric R. Pohl, Tarrytown; Enrico J. Pepe, Amawalk, both of N.Y.

[73] Assignee: Union Carbide Corporation, Danbury, Conn.

[21] Appl. No.: 748,357

[22] Filed: Jun. 24, 1985

[51] Int. Cl.$^4$ .............................................. C08G 77/04
[52] U.S. Cl. ................................... 528/33; 524/859; 524/860; 528/17; 528/18; 528/21; 528/38; 556/410; 556/413; 556/424
[58] Field of Search ............... 556/410, 424, 413; 528/33, 38, 17, 18, 21; 524/859, 860

[56] References Cited

U.S. PATENT DOCUMENTS

| | | | |
|---|---|---|---|
| 3,280,072 | 10/1966 | Frankland . | |
| 3,560,442 | 2/1971 | Golitz et al. . | |
| 3,621,047 | 11/1971 | Golitz et al. . | |
| 3,627,800 | 12/1971 | Owen | 556/424 |
| 3,796,686 | 3/1974 | Golitz et al. . | |
| 3,856,756 | 12/1974 | Wagner et al. | 556/424 |
| 4,448,694 | 5/1984 | Plueddeman | 556/424 |

OTHER PUBLICATIONS

Pohl, E. R., "Kinetics and Mechanisms of Acid- and Base-Catalyzed Hydrolysis of Alkyltrialkoxysilanes in Aqueous Solution," Proc. 38th Ann. Tech. Conf., Reinforced Plastics/Composite Inst., S.P.I., Sect. 4-B (1983).

Primary Examiner—Melvyn I. Marquis  
Attorney, Agent, or Firm—Steven H. Flynn

[57] ABSTRACT

Novel room temperature vulcanizable polydiorganosiloxane compositions comprising an α,ω-dihydroxypolydiorganosiloxane and a poly-(alkoxysilylalkyl)amine. These compositions are neutral cure, exhibit excellent shelf life stability, possess a practically controllable cure rate and upon curing produce elastomers which have good adhesion to building materials and which possess good weatherability.

12 Claims, No Drawings

NOVEL ROOM TEMPERATURE VULCANIZABLE POLYDIORGANOSILOXANE COMPOSITIONS

FIELD OF THE INVENTION

This invention relates to novel room temperature, moisture-curable, storage-stable compositions. More particularly this invention relates to sealant compositions comprising an α,ω-dihydroxypolydiorganosiloxane and a poly-(alkoxysilylalkyl)amine which has at least one amino group or one ring containing a silicon to nitrogen bond.

BACKGROUND OF THE INVENTION

Room temperature, moisture-curable compositions based on α,ω-dihydroxypolydiorganosiloxanes and cross-linkers are known to be useful for the preparation of elastomeric polymers, particularly elastomeric polymers useful in coating, caulking and sealing materials. A desirable property of these compositions is a practically controllable cure rate, i.e. the compositions should cure rapidly enough to become tack-free without undue delay but slowly enough to allow for a reasonable working ("tooling") period.

U.S. Pat. No. 3,280,072 describes the use of mono-aminoalkylalkoxysilanes as cross-linkers in combination with α,ω-dihydroxypolydiorganosiloxanes to produce compositions which upon exposure to moisture cure to form elastomeric polymers. However, the use of certain of these mono-aminoalkylalkoxysilanes, e.g., aminopropyltriethoxysilane, can result in compositions with unacceptably slow cure rates, e.g., requiring seven days or more to vulcanize.

To increase the cure rate of compositions containing α,ω-dihydroxypolydiorganosiloxanes, U.S. Pat. Nos. 3,560,442, 3,621,047 and 3,796,686 propose that the cross-linkers utilized in such compositions should be mono-, bis- or tris-aminoalkyltrialkoxysilanes with a methylene or substituted methylene bridge between the amino and silyl groupings.

In "Kinetics and Mechanisms of Acid- and Base-Catalyzed Hydrolysis of Alkyltrialkoxysilanes in Aqueous Solutions", E. R. Pohl, PROC. 38th ANN. TECH. CONF., REINFORCED PLASTICS/COMPOSITE INST., S.P.I., SECT 4-B (1983), E. R. Pohl disclosed that substitution of a methyl group for a larger alkyl group as the alkyl moiety of alkyltrialkoxysilanes increased the rate of hydrolysis of the alkoxy groups of alkyltrialkoxysilanes. Since hydrolysis is presumably involved in the curing process of the compositions described in the above-mentioned patents, E. R. Pohl's results are essentially consistent with the results obtained in these patents.

Applicants have discovered, however, that use of the cross-linkers described in U.S. Pat. Nos. 3,560,442, 3,621,047 and 3,796,686 in α,ω-dihydroxypoly-diorganosiloxane compositions can result in compositions that possess an unacceptably fast cure rates, e.g., some of these compositions cure in less than one minute. Such cure rates do not provide for an adequate period for working of the composition.

Accordingly, it is an object of the present invention to provide novel room temperature moisture-curable α,ω-dihydroxypolydiorganosiloxane compositions which possess a practically controllable cure rate, exhibit excellent shelf life stability and, upon curing, produce elastomers which have good adhesion to building materials and which possess good weatherability.

It is another object of the present invention to provide novel poly-(alkoxysilylalkyl)amines useful as cross-linkers in α,ω-dihydroxypolydiorganosiloxane compositions.

DESCRIPTION OF THE INVENTION

This invention relates to a room temperature moisture-curable and storage stable α,ω-dihydroxypolydiorganosiloxane composition comprising (i) an α,ω-dihydroxypolydiorganosiloxane comprising a chain of recurring $Z_2SiO$ units, wherein each Z is a substituted or unsubstituted monovalent hydrocarbon group, end-blocked with silicon-bonded hydroxyl groups; and (ii) a poly-(alkoxysilylalkyl)amine of the formula:

[FORMULA I]

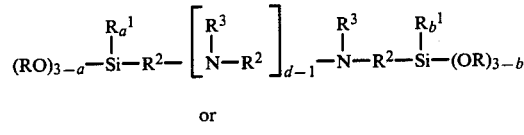

or

[FORUMLA II]

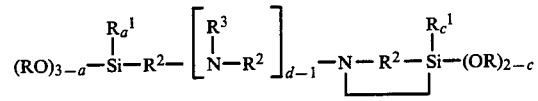

wherein
R is $C_1$–$C_4$ alkyl;
$R^1$ is hydrogen, $C_1$–$C_6$ alkyl or $C_6$–$C_{12}$ aryl;
$R^2$ is $C_2$–$C_8$ alkylene, $C_6$–$C_{12}$ arylene or $C_7$–$C_{14}$ alkarylene;
$R^3$ is hydrogen, $C_1$–$C_6$ alkyl, $C_6$–$C_{12}$ aryl or

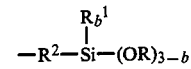

wherein R, $R^1$ and $R^2$ are as defined above;
a and b are 0, 1 or 2; c is 0 or 1; and d is 1, 2 or 3.

For the purposes of the specification and the claims the symbols in Formulas I and II above can have the same or different meanings within each formula (e.g., the first R can be the same as or different from the second R in each formula).

The α,ω-dihydroxypolydiorganosiloxanes useful in this invention have viscosities ranging from about 10 to about 100,000 centistokes at room temperature, preferably from about 10,000 to about 80,000 centistokes at room temperature. These α,ω-dihydroxypolydiorganosiloxanes can be homopolymers or copolymers in which Z is a monovalent hydrocarbon radical, such as methyl, ethyl, propyl, phenyl or vinyl radical, or a substituted monovalent hydrocarbon radical, such as chlorophenyl, trifluoropropyl or cyanopropyl radical. Preferably Z is methyl but small amounts, i.e., up to about two mole percent, of various other groups, such as ethyl, propyl, phenyl, vinyl, 3,3,3-trifluoropropyl and cyanoethyl, can be substituted for the methyls in the preferred embodiment of this invention.

Preferred poly-(alkoxysilylalkyl)amines useful in this invention are those wherein $R^1$ is $C_1$–$C_4$ alkyl; $R^3$ is hydrogen, methyl or ethyl; and $R^2$ is $C_3$–$C_8$ alkylene, particularly when d is 1. Most preferred poly-(alkoxysilylalkyl)amines are those wherein R is methyl or ethyl; $R^1$ is $C_1$-$C_4$ alkyl; $R^3$ is hydrogen or methyl; $R^2$ is propylene; a and b are 0 or 1; and d is 1.

Illustrative of the poly-(alkoxysilylalkyl)amines which can be used in this invention are the following:

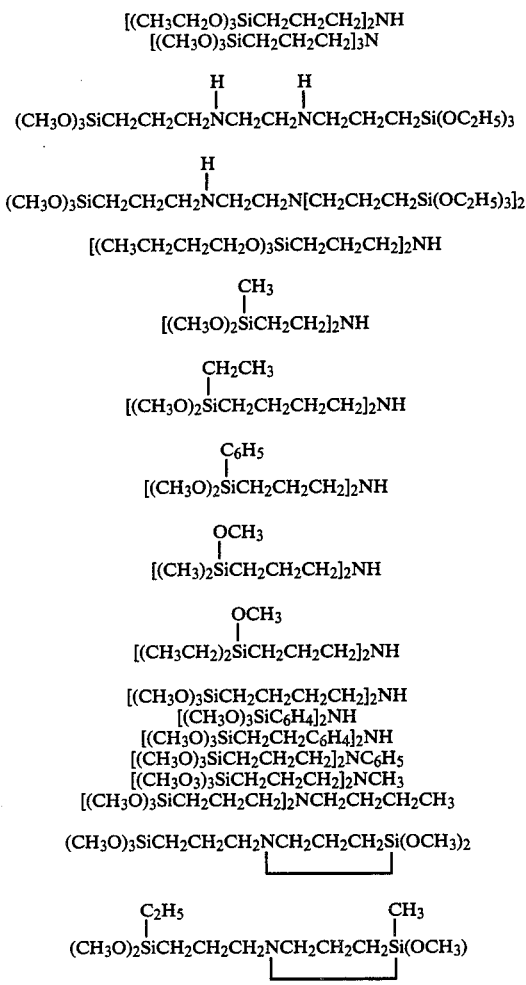

The poly-(alkoxysilylalkyl)amines represented by Formula I above are known compositions of matter [see, e.g., U.S. Pat. No. 2,832,754] and can be produced by the known processes of reacting a chloro-substituted alkyltrialkoxysilane with an amino-substituted alkyltrialkoxysilane. The poly-(alkoxysilylalkyl)amines represented by Formula II above are novel compositions of matter which form a part of the present invention and which can be produced by any suitable process. By way of illustration, the poly-(alkoxysilylalkyl)amines of Formula II can be produced by heating the poly-(alkoxysilylalkyl)amines of Formula I at a temperature of from about 90° to about 400° C., optionally in the presence of an acid catalyst such as benzoic acid or ammonium chloride and optionally in the presence of a nonprotic solvent such as a xylene, at atmospheric, superatmospheric or sub-atmospheric pressure, to produce the amines of Formula II and an alcohol (ROH) by-product.

The amount of poly-(alkoxysilylalkyl)amine employed in the compositions of this invention can vary depending, among other factors, on the desired rates of cross-linking and on the poly-(alkoxysilylalkyl)amine employed. In general, the amount of poly-(alkoxysilylalkyl)amine employed can be from about 0.1 percent to about 50 percent by weight based on the weight of the α,ω-dihydroxypolydiorganosiloxane. Preferably, the amount of the poly-(alkoxysilylalkyl)amine employed will be from about 0.8% to about 10% and most preferably from about 2% to about 8% by weight based on the weight of the α,ω-dihydroxypolydiorganosiloxane.

The compositions of this invention can be produced by mixing the two components, namely the α,ω-dihydroxypolydiorganosiloxane and the poly-(alkoxysilylalkyl)amine, at room temperature or elevated temperatures up to the boiling point of the lowest boiling component, preferably between about 20° C. to about 100° C., in a dry environment (moisture free). The mixing can be conducted at atmospheric, superatmospheric or subatmospheric pressures.

The compositions of this invention vulcanize or cure into a cross-linked, three-dimensional network upon exposure to moisture without splitting off acids or amines. The curing of the compositions of this invention produce crosslinked silicone elastomeric polymers and non-corrosive, low odor, neutral, low molecular weight alcohols.

The cure rate of the compositions of this invention is dependent on atmospheric temperature, relative humidity, the presence or absence of a silanol condensation catalyst, and the like, but, in general, the compositions of this invention will cure to a tack-free state in a relatively short period of time. Preferably, the compositions should not cure to a tack-free state in less than about 15 minutes to allow for a practical working ("tooling") time. As a practical matter, it is preferable to allow the compositions of this invention to continue curing beyond the period of time required to a achieve a tack-free elastomer. This is desirable to assure that the elastomer will be fully cured, i.e., that the reaction of the siloxanes with the moisture and with each other is complete. The elastomers formed from the compositions of this invention will generally be fully cured in less than seven days.

It is generally preferred to employ a catalyst to facilitate the vulcanization. Any well known silanol condensation catalyst may be employed, for example, alkyl titanates, organosilicon titanates, metal salts of carboxylic acids such as stannous octoate, dibutyltindilaurate and the like, amine salt such as dibutylamine-2-ethylhexoanate and the like, or other conventional acidic or basic catalysts. The catalyst can be added during or after the preparation of the composition and is used in an amount sufficient to cure the composition upon exposure to moisture, for example from about 25 to about 500 parts by weight per million parts by weight of the composition.

The compositions of this invention can also be modified by incorporating therein any of the conventional elastomer fillers, e.g., reinforcing fillers, such as fumed silicas, silica aerogels and precipitated silicas of high surface area. Nonreinforcing fillers can also be used, for example, coarse silicas, such as diatomaceous earth, crushed quartz or metallic oxides, such as titania, ferric oxide, zinc oxide, talc and the like. In addition fibrous fillers such as asbestos or glass fibers or filaments may be used. In all cases, it is desirable that the filler be substantially dry before being admixed with the polymers. The fillers are generally employed to upgrade physical properties and to modify the flow characteristics of the uncured polymer. The fillers can comprise as much as 70% by weight of the total weight of the composition provided that no more than 30% by weight of the total weight of the composition are reinforcing fillers. Preferably the fillers will comprise from 0% to about 40% by weight of the total weight of the composition provided that only from 0% to 20% by weight of the total weight of the composition are reinforcing fillers. The compositions of this invention may also contain modifiers such as resinous siloxane modifiers as plasticizers (e.g., trimethylsilyl-capped polydimethylsiloxane) or to make the cured polymers more dough-like and less resilient, as well as additives such as pigments, UV stabilizers, oxidation inhibitors and the like or dielectric substances such as graphite and carbon black. It is immaterial whether these fillers, modifiers or additives and the like are added to the sealant compositions of this invention during or after their preparation as described herein. However, it is most preferable that they be added under substantially anhydrous conditions.

It will be understood that the compositions of this invention can comprise mixtures of the poly-(alkoxysilylalkyl)amines defined by this invention as well as combinations of the poly-(alkoxysilylalkyl)amines of this invention with a minor amount other silicon-based cross-linkers or chain extenders (e.g., methyltrimethoxysilane) to selectively alter the inherent properties of the composition such as, e.g., cure rate, flexibility and elongation of the cured polymer, and the like.

The compositions of this invention should be stored in the absence of moisture or viscosity buildup or gellation can occur. Compositions of this invention have excellent storage stability (usually greater than six months) when stored in the absence of moisture.

The vulcanized polymers produced from the compositions of this invention are useful in coating applications and in caulking and sealing applications on buildings, airplanes, bathrooms fixtures, automotive equipment or wherever elastomeric polymers are employed. Another desirable feature of these compositions is their ability to be applied to moist or wet surfaces and be cured into a cross-linked elastomer without deleterious effects, which cured product becomes tack-free within a relatively short period of time. Moreover, the cured compositions of this invention strongly adhere alone or with the aid of a primer to a wide variety of substrates such as glass, porcelain, wood, metals, polymeric materials and the like making them especially suited for many types of caulking, adhesive or laminating application.

The following Examples are provided to illustrate the present invention. The abbreviations and symbols used in the Examples have the following meanings:

| ABBREVIATION OR SYMBOL | MEANING |
|---|---|
| °C. | degree Centigrade |
| °F. | degree Fahrenheit |
| m. | meter |
| mm. | millimeter |
| ml. | milliliter |
| g. | gram |
| in. | inch |
| min. | minute |
| sec. | second |
| psi | pounds per square inch |
| ppi | pounds per inch |
| pli | pounds per length inch |
| rpm | revolutions per minute |

| ABBREVIATION OR SYMBOL | MEANING |
|---|---|
| cstk | centistoke |
| % | percent |

EXAMPLE I

A. Preparation of Sealant Composition

Into a 1 gallon, jacketed mixing kettle that was flushed with nitrogen and preheated to 95° C. using steam, were added treated fumed silica ("Aerosil R-972") with 110±20 m.²/g. surface area (100 g.); α,ω-dihydroxypolydimethylsiloxane with a viscosity of 48,630 centistokes at 25° C. (850 g., 0.015 moles); and trimethylsilyl-capped polydimethylsiloxane having a viscosity of 1000 cstk at 25° C. (150 g.). The materials were mixed under nitrogen using a Ross Model LDM Double Planetary Laboratory Mixer at 20 rpm orbital speed for 5 minutes. The system was evacuated to 5 mm Hg and mixed for 40 minutes, followed by the additions of N,N-bis-(3-trimethoxysilylpropyl)amine (45 g., 0.013 moles) and dibutyltindilaurate (0.1 g.), and then mixed for an additional 45 minutes under vacuum at 30 rpm orbital speed to form a sealant composition. The composition so formed was removed from the kettle using a H.S. Bancroft vaculoader and stored in polyethylene cartridges.

B. Testing Procedure

The following procedure utilized to test the composition prepared as described above were in compliance with Federal Specification TT-S-001543A and ASTM C 920-79.

Two 6 in.×6 in.×0.125 in. plaques were prepared as follows: Approximately 95 g. of the sealant composition was charged to the center of a 0.1 mm×8 in.×8 in. piece of water soluble paper. A 6 in.×6 in.×0.125 in. metal frame was placed on the paper followed by another sheet of paper. The sealant composition was uniformly distributed inside the frame by pressing down on the top sheet of paper with a metal plate. The preparation of the plaques from the sealant composition was accomplished in approximately 5–8 minutes. The plaque of sealant composition was placed in a Forma Scientific Environmental Chamber that was set at 25° C. (77° F.) and 30 percent relative humidity. After 5 days, the paper was etched from the plaques using distilled water. The plaques were then allowed to equilibrate in the environmental chamber for an additional 2 days.

Hardness of the plaques was measured using a Shore 2A Durometer. Six measurements were randomly taken across the surface of ¼ in. thick cured sealant composition sample. The average value was recorded.

Six tensile specimens and six tear specimens were prepared from the cured sealant composition plaques using the ASTM D 412-80 DIE C and ASTM D 624-81 DIE B, respectfully. The tear specimens were notched using a Wallace Cutter. The specimens were stretched until they broke using the Monsanto Tensometer. The crosshead speed was 20 in./min. Values of tensile, tear, modulus (100%) and percent elongation were automatically computed by the tensometer.

Adhesion of the sealant composition to aluminum and glass was determined using a 180° peel test. The substrates were washed with acetone. Standard 1 in.×3 in.

peel specimens were prepared according to Federal Specification TT-S-001543A. The peel specimens were cured for 21 days in a Forma Scientific Environmental Chamber at 25° C. (77° F.) and 30 percent relative humidity and then immersed in distilled water for seven days at ambient temperature. The 180° peel test was carried out in quadruplet using an Instron, Model 1123.

EXAMPLES 2-11

In a manner similar to that employed in Example 1 and using the same ingredients as in the composition of Example 1, other sealant compositions of this invention (compositions of Examples 2–11) were prepared and tested. The respective formulations and test results for these compositions are set forth in Table 1 below.

move the triethyl ammonium chloride and the crude product was distilled at 2.2 mm Hg at 77° C. to produce N,N-bis-(triethoxysilylmethyl)allylamine. The N,N-bis-(triethoxysilylmethyl)allylamine so produced was found to be greater than 95% pure by gas chromatography.

(1) N,N-bis-(trimethoxysilylmethyl)allylamine produced as described above (1.33 g., 0.004 mole), $\alpha,\omega$-dihydroxypolydimethylsiloxane of 20,000 cstk at 25° C. (100 g., 0.002 mole) and dibutyltindilaurate (a silanol condensation catalyst) (0.01 gm), were mixed in a 500 ml. container using a wooden stick. The mixture gelled within 1 minute.

(2) N,N-bis-(trimethoxysilylmethyl)allylamine produced as described above (0.67 g., 0.002 mole) and $\alpha,\omega$-

TABLE I

| Physical Properties of Sealant Compositions | | | | | | | | | | | |
|---|---|---|---|---|---|---|---|---|---|---|---|
| | Formulation of Sealant Composition of Example # | | | | | | | | | | |
| | 1 | 2 | 3 | 4 | 5 | 6 | 7 | 8 | 9 | 10 | 11 |
| Ingredient* | | | | | | | | | | | |
| $\alpha,\omega$-dihydroxy-polydimethylsiloxane | 85 | 70 | 85 | 95.5 | 85 | 74.5 | 74.5 | 85 | 85 | 100 | 95.5 |
| Trimethyl-capped polydimethylsiloxane | 15 | 30 | 15 | 4.5 | 15 | 25.5 | 25.5 | 15 | 15 | 0 | 4.5 |
| N,N—bis-(3-trimethoxy-silylpropyl)amine | 4.5 | 4.5 | 1 | 7 | 4.5 | 2 | 7 | 8 | 4.5 | 4.5 | 2 |
| Treated fumed silica | 10 | 5 | 5 | 15 | 0 | 15 | 15 | 5 | 20 | 5 | 15 |
| Dibutyltindilaurate | .01 | .01 | .01 | .01 | .01 | .01 | .01 | .01 | .01 | .01 | .01 |
| PHYSICAL PROPERTIES | | | | | | | | | | | |
| Hardness, Shore 2A, (points) | 19 | 10 | — | 30 | 12 | 20 | 30 | 25 | 33 | 18 | 30 |
| Extrusion Rate, (sec/100 g.) | 9 | 4 | — | 5 | 3 | 250 | 16 | 3 | — | 10 | — |
| Tensile (psi) | 99 | 53 | — | 249 | 40 | 187 | 126 | 77 | 230 | 68 | 288 |
| Tear (ppi) | 19 | 6 | — | 25 | 5 | 24 | 27 | 10 | 35 | 16 | 41 |
| % elongation | 127 | 152 | — | 263 | 136 | 279 | 163 | 145 | 183 | 123 | 290 |
| Modulus (100%) | 68 | 36 | — | 91 | 35 | 69 | 86 | 57 | 124 | 58 | 102 |
| Peel (180°, pli) | | | | | | | | | | | |
| Aluminum | 4 | 4 | — | 3 | 4 | 1 | 4 | 4 | 2 | 1 | 2 |
| Glass | 6 | 6 | — | 3 | 5 | 1 | 9 | 9 | 2 | 2 | 8 |

*Parts by weight
—Not tested

As shown below, direct comparisons were made between the compositions of the present invention and comparative compositions of the prior art to demonstrate the unexpectedly superior cure rate of the composition of this invention with and without a silanol condensation catalyst.

The comparative examples (Examples A and B) and Examples 12 and 13 illustrating this invention all utilized $\alpha,\omega$-dihydroxypolydimethylsiloxane having a viscosity of 20,000 cstk at 25° C. Comparative Example A uses N,N-bis-(triethoxysilylmethyl)allylamine (disclosed in U.S. Pat. No. 3,796,686) as the crosslinker. Comparative Example B uses N,N-bis-(trimethoxysilylmethyl)amine (disclosed in U.S. Pat. No. 3,560,442) as the crosslinker. Examples 12 and 13, which illustrate the present invention, both use as a crosslinker N,N-bis-(3-trimethoxysilylpropyl)amine.

COMPARATIVE EXAMPLE A

Triethyl amine (133 g., 1.31 moles) and allyl amine (10.0 g., 0.175 mole) were charged to a 500 ml., three-neck, round bottom flask that was equipped with condenser, thermometer, dropping funnel and a magnetic stirring bar. Chloromethyltrimethoxysilane (60.0 g., 0.350 mole) was added dropwise at room temperature. The mixture was refluxed for 12 hours and then cooled to room temperature. The mixture was filtered to redihydroxy-polydimethylsiloxane of 20,000 cstk at 25° C. (50.0 g., 0.001 mole) were mixed in a 500 ml. container using a wooden stick. The mixture gelled within 1 minute.

COMPARATIVE EXAMPLE B

Chloromethyltrimethoxysilane (50.0 g., 0.29 mole) and ammonia (98.6 g., 5.80 mole) were charged to a 300 ml. stainless steel pressure vessel. The mixture was heated to 100° C. at 800 psi pressure for 8 hours and then cooled. The mixture was filtered. The crude product was distilled at 60° C. and 0.2 mm Hg pressure to produce N,N-bis-(trimethoxysilylmethyl)amine. The N,N-bis-(trimethoxysilylmethyl)amine so produced (3.0 g., 0.01 mole) was found to be greater than 95% pure by gas chromatography.

(1) N,N-bis-(trimethoxysilylmethyl)amine produced as described above (1.16 g., 0.004 mole), $\alpha,\omega$-dihyroxypolydimethysiloxane of 20,000 cstk at 25° C. (100 g., 0.002 mole) and dibutyltindilaurate (0.01 g.) were mixed in a 500 ml. container using a wooden stick. The mixture gelled within 1 minute.

(2) N,N-bis-(trimethoxysilylmethyl)amine produced as described above (0.58 g., 0.002 mole) and $\alpha,\omega$-dihydroxypolydimethylsiloxane of 20,000 cstk at 25° C. (50.0 g., 0.001 mole) were mixed in a 500 ml. container using a wooden stick. The mixture gelled within 1 minute.

EXAMPLE 12

N,N-bis-(3-trimethoxysilylpropyl)amine (1.5 g., 0.004 mole) and α,ω-dihyroxypolydimethylsiloxane of 20,000 cstk at 25° C. (100 g., 0.002 mole) were mixed in a 500 ml container using a wooden stick for 3 to 5 minutes to form a composition of this invention. The trapped air was removed by placing the composition mixture so formed in a vacuum desiccator at 1 mm Hg pressure for 10 to 20 minutes. A 6 in.×6 in.×0.125 in. plaque was made from the degassed mixture as described in Example 1. The mixture was then exposed to 50 percent relative humidity at 22° C. Within 5 days, the mixture became a tack free silicone elastomer. After curing for 21 days at 50 percent relative humidity and 22° C., the physical properties were measured according to the procedures described in Example 1. The measured physical properties were:

| Hardness, Shore 2A (points) | 9 |
|---|---|
| Tensile (psi) | 33 |
| % Elongation | 47 |

The composition of this Example was allowed to cure for 21 days in accordance with Federal Specification TT-S-001543A although no adhesion testing was conducted on the elastomer formed by the composition of this Example.

EXAMPLE 13

N,N-bis-(3-trimethoxysilylpropyl)amine (1.5 g., 0.004 mole), α,ω-dihydroxypolydimethylsiloxane of 20,000 cstk at 25° C. (100 g., 0.002 mole) and dibutyltindilaurate (0.01 g.) were mixed in a 500 ml. container using a wooden stick for 3 to 5 minutes to form a composition of this invention. The trapped air was removed by placing the composition mixture so formed in a vacuum desiccator at 1 mm Hg pressure for 10 to 20 minutes. A 6 in.×6 in.×0.125 in. plaque was made from the depressed mixture as described in Example 1. The mixture was exposed to 50 percent relative humidity at 22° C. Within 2 hours, the mixture became a tack free silicone elastomer. After curing for 11 days at 50 percent relative humidity and 22° C. to assure that the elastomer was fully cured, the physical properties of the elastomer so formed were determined according to the procedures described in Example 1. The measured physical properties were:

| Hardness, Shore 2A (points) | 13 |
|---|---|
| Tensile (psi) | 33 |
| % Elongation | 43 |

The results of this comparative testing (Comparative Examples A and B vs. Examples 12 and 13) demonstrate the superior cure rate of the compositions of this invention both with and without the addition of a silanol condensation catalyst. The tested comparative compounds of the prior art, on the other hand, did not exhibit an acceptable cure rate. The cure rate for both of the tested prior art compositions was too fast even in the absence of a catalyst.

EXAMPLE 14

Into a 1 liter, three-neck flask equipped with a thermometer, thermosensor, mechanical stirrer and a distillation head with nitrogen line and a receiver flask were charged α,ω-dihydroxypolydimethylsiloxane with a viscosity of 1000 cstk at 25° C. (548 g., 0.02 mole) and

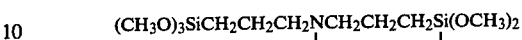

(12.38 g., 0.04 mole). The reaction mixture was stirred until it was homogeneous, heated to 50° C. at atmospheric pressure for 30 minutes and then cooled to form the composition. A thin film of the composition so formed was cast (casting time was less than one minute) and allowed to cure at 21° C. and 51% relative humidity. The composition formed a skin (i.e. became tack-free) in approximately 15 minutes. The composition was fully cured within 24 hours.

EXAMPLE 15

Into a 1 liter, three-neck flask equipped with a thermometer, thermosensor, mechanical stirrer and distillation head with nitrogen line and a receiver flask were charged α,ω-dihydroxypolydimethylsiloxane fluid with a viscosity of 1000 cstk at 25° C. (548 g., 0.02 mole) and

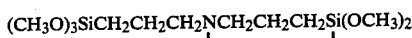

(12.38 g., 0.04 mole). The reaction mixture was stirred until it was homogeneous, heated to 50° C. at atmospheric pressure for 30 minutes and then cooled to form the intermediate reaction product. The intermediate reaction product so formed had the structure:

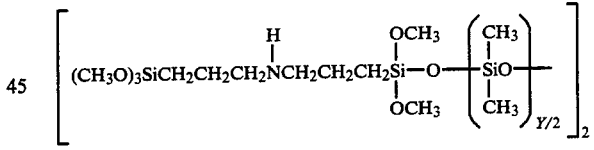

The reaction mixture containing the intermediate reaction product was then heated to 150° C. under vacuum to remove the methanol. The reaction mixture was stripped until bumping ceased to form the final reaction product. The final reaction product so formed had the structure:

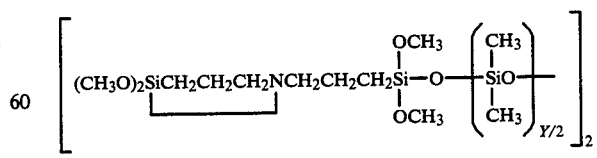

A thin film of the final reaction product was cast (casting time was less than one minute) and allowed to cure at 21° C. and 51% relative humidity. The film became tack-free in approximately 15 minutes. The material was fully cured within 24 hours.

EXAMPLE 16

Into a 1 gallon, jacketed mixing kettle that was flushed with nitrogen and preheated to 95° C. using steam, were added "Aerosil R-972" treated fumed silica with 110±20 m.²/g. surface area (95 g.), α,ω-dihydroxypolydimethylsiloxane with a viscosity of 48,630 cstk at 25° C. (624 g., 0.011 mole), and trimethylsilyl-terminated polydimethylsiloxane fluid with a viscosity of 1000 cstk at 25° C. (241 g.). The materials were mixed under nitrogen using a Ross Model LDM Double Planetary Laboratory Mixer at 20 rpm orbital speed for 5 minutes.

The system was evacuated to 5 mm Hg and the materials were then mixed for 40 minutes. At this point, methyltrimethoxysilane (30 g., 0.11 mole), N,N-bis-(3-trimethoxysilylpropyl)amine (10 g., 0.029 mole) and dibutyltindilaurate (0.1 g.) were added to the materials to form the reaction mixture. The reaction mixture so formed was then mixed for 45 minutes under vacuum at 30 rpm to form the composition. The composition so formed was exposed to 50 percent relative humidity at 22° C. to form the cured elastomer. The composition so formed became tack-free in approximately 50 minutes and was fully cured in less than 7 days. The cured elastomer so formed was tested according to the procedures described in Example 1. The measured physical properties were:

| | | |
|---|---|---|
| Hardness, Shore 2A (points) | 18 | |
| Percent elongation | 245 | |
| Modulus (100%, psi) | 67 | |
| Tensile (psi) | 176 | |
| Tear (psi) | 20 | |
| Tack free time (minutes) | 40–50 | |
| Adhesion: 7 day cure | | |
| Aluminum (pli) | 6.5 | (cohesive) |
| Glass (pli) | 6.7 | (cohesive) |
| 21 day cure, 7 day water soak | | |
| Aluminum (pli) | 7.3 | (cohesive) |
| Glass (pli) | 7.0 | (cohesive) |
| Extrusion rate (sec/100 g.) | 45 | |

Example 17 illustrates a process for the preparation of the novel poly-(alkoxysilylalkyl)amines of Formula II, namely the preparation of N-(trimethoxysilylpropyl)-2,2-dimethoxy-2-silapyrrolidine.

EXAMPLE 17

A. Synthesis of N,N-bis-(3-trimethoxysilypropyl)amine.

Into a 3 liter, three-neck flask that was equipped with a thermometer, mechanical stirrer and equalizing pressure dropping funnel was added 3-aminopropyltrimethoxysilane (6 moles, 1433 g.) that was then heated to 110° C. 3-Chloropropyltrimethoxysilane (4 moles, 794 g.) was added dropwise. After addition of the 3-chloropropy silane, the reaction mixture was heated for 1 hour at 130° C., and cooled to room temperature. Ethylenediamine (3.2 moles, 190 g.) was added and the mixture was stirred for 10 minutes. The solution formed two layers. The two layers were separated and the top layer was distilled. N,N-bis-(3-trimethoxysilylpropyl)amine (1.5 moles, 517 g.) was collected at 143°–145° C. and 1.5 mmHg pressure.

B. Synthesis of N-(3-trimethoxysilylpropyl)-2,2-dimethoxy-2-silapyrrolidine.

Into a liter flask that was equipped with a Vigreaux column and a distillation head was added the N,N-bis-(3-trimethoxysilylpropyl)amine so formed (1.47 moles, 500 g.) and benzoic acid (0.06 moles, 10 g.) The reaction mixture was heated under reduced pressure (pot temperature was 157°–160° C. at 18 mmHg) to remove the methanol that was being formed. After the formation of methanol was stopped, the reaction product was distilled at 125°–127° C. at 1 mm Hg pressure. The yield of product was found to be 366 g. or 60 percent.

What is claimed is:

1. A room temperature, moisture-curable polydiorganosiloxane composition comprising
   (i) an α,ω-dihydroxypolydimethylsiloxane; and
   (ii) a poly-(alkoxysilylalkyl)amine of the formula:

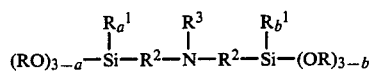

wherein
   R is $C_1$–$C_4$ alkyl;
   $R^1$ is $C_1$–$C_4$ alkyl;
   $R^3$ is hydrogen, methyl or ethyl;
   $R^2$ is $C_3$–$C_8$ alkylene; and
   a and b are 0, 1 or 2.

2. A composition as recited in claim 1 wherein the poly-(alkoxysilylalkyl)amine is present in an amount ranging from 2% to 8% by weight based on the weight of the α,ω-dihydroxypropyldimethylsiloxane.

3. A composition as recited in claim 1 wherein R is methyl or ethyl; $R^3$ is hydrogen or methyl; $R^2$ is propylene; and a and b are 0 or 1.

4. A composition as recited in claim 1 wherein the poly-(alkoxysilylalkyl)amine is N,N-bis-(3-trimethoxysilylpropyl)amine.

5. A composition as recited in claim 1 admixed with a filler.

6. A composition as recited in claim 1 admixed with a silanol condensation catalyst in an amount sufficient to cure the composition upon exposure to moisture.

7. A composition as recited in claim 6 admixed with a filler.

8. A room temperature, moisture-curable polydiorganosiloxane composition comprising
   (i) an α,ω-dihydroxypolydimethylsiloxane; and
   (ii) a poly-(alkoxysilylalkyl)amine of the formula:

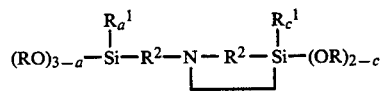

wherein
   R is $C_1$–$C_4$ alkyl;
   $R^1$ is $C_1$–$C_4$ alkyl;
   $R^2$ is $C_3$–$C_8$ alkylene;
   a is 0, 1 or 2; and
   c is 0 or 1.

9. A composition as recited in claim 8 wherein R is methyl or ethyl; $R^2$ is propylene; and a is 0 or 1.

10. A composition as recited in claim 8 admixed with filler.

11. A composition as recited in claim 8 admixed with a silanol condensation catalyst in an amount sufficient to cure the composition upon exposure to moisture.

12. A composition as recited in claim 11 admixed with a filler.

* * * * *